United States Patent [19]
Goode et al.

[11] Patent Number: 5,966,162
[45] Date of Patent: *Oct. 12, 1999

[54] METHOD AND APPARATUS FOR MASKING THE EFFECTS OF LATENCY IN AN INTERACTIVE INFORMATION DISTRIBUTION SYSTEM

[75] Inventors: Christopher Goode, Menlo Park; Donald Gordon, Pacific Grove; Mark D. Conover; Daniel Illowsky, both of Cupertino; Philip A. Thomas, San Jose; Brooks Cole, Point Reyes Station, all of Calif.

[73] Assignee: DIVA Systems Corporation, Menlo Park, Calif.

[ * ] Notice: This patent is subject to a terminal disclaimer.

[21] Appl. No.: 09/074,289

[22] Filed: May 7, 1998

Related U.S. Application Data

[63] Continuation of application No. 08/738,361, Oct. 25, 1996, Pat. No. 5,781,227.

[51] Int. Cl.⁶ ........................................................ H04N 7/10
[52] U.S. Cl. .............................. 348/10; 445/6.2; 348/595
[58] Field of Search .................................. 348/7, 595, 10, 348/11, 12, 13, 578, 584, 586, 594, 601; 455/6.2, 6.3, 5.1, 4.2; H04N 7/173, 5/272, 5/275, 5/262, 5/265

Primary Examiner—Andrew I. Faile
Assistant Examiner—Uyen Le
Attorney, Agent, or Firm—Thomason & Moser

[57] ABSTRACT

A method and apparatus for masking the effects of latency within an information distribution system. The apparatus comprises a set top terminal that requests and receives information from an information server within the information distribution system. The information is generally displayed upon a conventional television that is coupled to the set top terminal. The set top terminal contains a central processing unit and an information stream decoder that are programmed to implement the method. The method is a routine which is executed when a subscriber selects certain functions, usually via a remote control, that are available for the set top terminal to perform. Upon execution, the method recalls a predefined image from memory and begins to fade the presently displayed image into a predefined image, e.g., a white screen. Simultaneously, the presently playing sound is also faded into the predefined sound, e.g., no sound. The decoder within the set top terminal is reset to flush from its buffer and residual sound or video information from the previously decoded video. Lastly, once the new video stream has arrived and begins to be decoded, the set top terminal fades up from the pre-defined image to the new video stream and from the pre-defined audio to the audio stream that accompanies the video stream. At this point, the subscriber's selected function has been fully implemented without display of the detrimental affects usually associated with a latency delay.

29 Claims, 2 Drawing Sheets

METHOD AND APPARATUS FOR MASKING THE EFFECTS OF LATENCY IN AN INTERACTIVE INFORMATION DISTRIBUTION SYSTEM

This application is a continuation of application Ser. No. 08/738,361 filed Oct. 25, 1996 now U.S. Pat. No. 5,781,227.

BACKGROUND OF THE INVENTION

1. Field of the Invention

The present invention relates to an interactive information distribution system such as a video-on-demand (VOD) system. More particularly, the present invention relates to a method and apparatus for masking the effects of latency within such an interactive information distribution system.

2. Description of the Background Art

Recent advances in digital signal processing techniques and, in particular, improvements in digital compression techniques, have led to a plethora of proposals for providing new digital services to a subscriber's home via existing telephone and coaxial cable networks. For example, it has been proposed to provide hundreds of cable television channels to subscribers by compressing digital video, transmitting the compressed digital video over conventional coaxial cable television channels, and then decompressing the video at a subscriber's set top terminal. Another proposed application of this technology is a video-on-demand system in which a subscriber communicates directly with a video service provider via telephone lines to request a video program from a video library and the requested video program is routed to the subscriber's home via telephone lines or via coaxial cable television cables for immediate viewing. Other proposed video-on-demand systems use a frequency multiplexing technique to enable control information from a set top terminal to be transmitted through a cable network back to an information server. Such a system permits bi-directional communications between the service provider and the subscriber over a single network.

In each of these information distribution systems, the compression and decompression techniques as well as processing of control information requires a substantial amount of time. As such, a customer experiences a significant delay or latency between the selection of a function via their set top terminal and when the selected function is actually implemented upon the screen of their television. Heretofore this latency has merely been an annoyance which, for the most part, has been ignored by the interactive information distribution system providers. Typically, upon selection of a certain function, such as stop or pause, while viewing a particular video stream, the present systems merely delay the time of implementing that stop or pause function by the amount of latency. The latency can be in excess of five seconds. Furthermore, if a customer has a particular video stream being displayed and then selects a second video stream for display, present systems, after a slight control signal processing delay, switch from one video stream to another video stream without any attempt to smooth the transition. As such, the video that is received and decoded by the user's set top terminal is generally garbled or distorted during the transition period. If a customer is rapidly switching from video stream to video stream, e.g., channel surfing, the customer will view garbled video images for a substantial amount of time between "channel" changes. Such an extended period of garbled images is unacceptable for a commercial system.

Therefore, there is a need in the art for a method and apparatus for masking the effects of latency in an interactive information distribution system.

SUMMARY OF THE INVENTION

The disadvantages heretofore associated with the prior art are overcome by the present invention of a method and apparatus for masking the effects of latency within an interactive information distribution system. The apparatus of the present invention comprises a set top terminal for requesting and receiving information from an information server. The requested information is typically displayed upon a conventional television that is connected to the set top terminal. The set top terminal contains a central processing unit and a compressed video decoder that are programmed to implement the method of the present invention. The method is routine which is executed when a subscriber selects certain functions, usually via an input device such as a remote control, that are used to control the flow of information to a television in the subscriber's home. These certain functions that result in execution of the latency masking routine are those that require the information server to provide a new information stream, e.g., selecting a new program for viewing, changing on-screen menus, and the like.

Once executed, the routine first acknowledges the selected function by displaying the function name or icon as a graphic on the screen of the television. This graphic is generated by the set top terminal. Simultaneous with generating an acknowledgment, the set top terminal sends an upstream command to implement the selected function to the information server via a command channel of the information distribution system, e.g., a telephone network, a frequency multiplex channel through a cable network, and the like. Thereafter, the method begins to fade the presently displayed image into a predefined image, e.g., a white screen, a graphic image, animation, a video clip, and the like. Simultaneously, the presently playing audio is also faded to a predefined audio, e.g., no sound or a sound that compliments the predefined image. The decoder within the set top terminal is reset to flush from its buffer any residual audio or video data from the previously decoded information stream. Thereafter, the set top terminal awaits a new information stream to arrive from the information server while presenting the customer with the predefined image and audio. Lastly, once the new information stream has arrived and begins to be decoded, the set top terminal fades from the predefined image to the new information stream and from the pre-defined audio to the audio stream that accompanies the new video stream. At this point, the customer's selected function has been fully implemented without viewing the detrimental affects usually associated with a latency delay, i.e., the latency has been masked. Once complete, the latency routine becomes dormant and awaits the next function to be selected by the customer.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
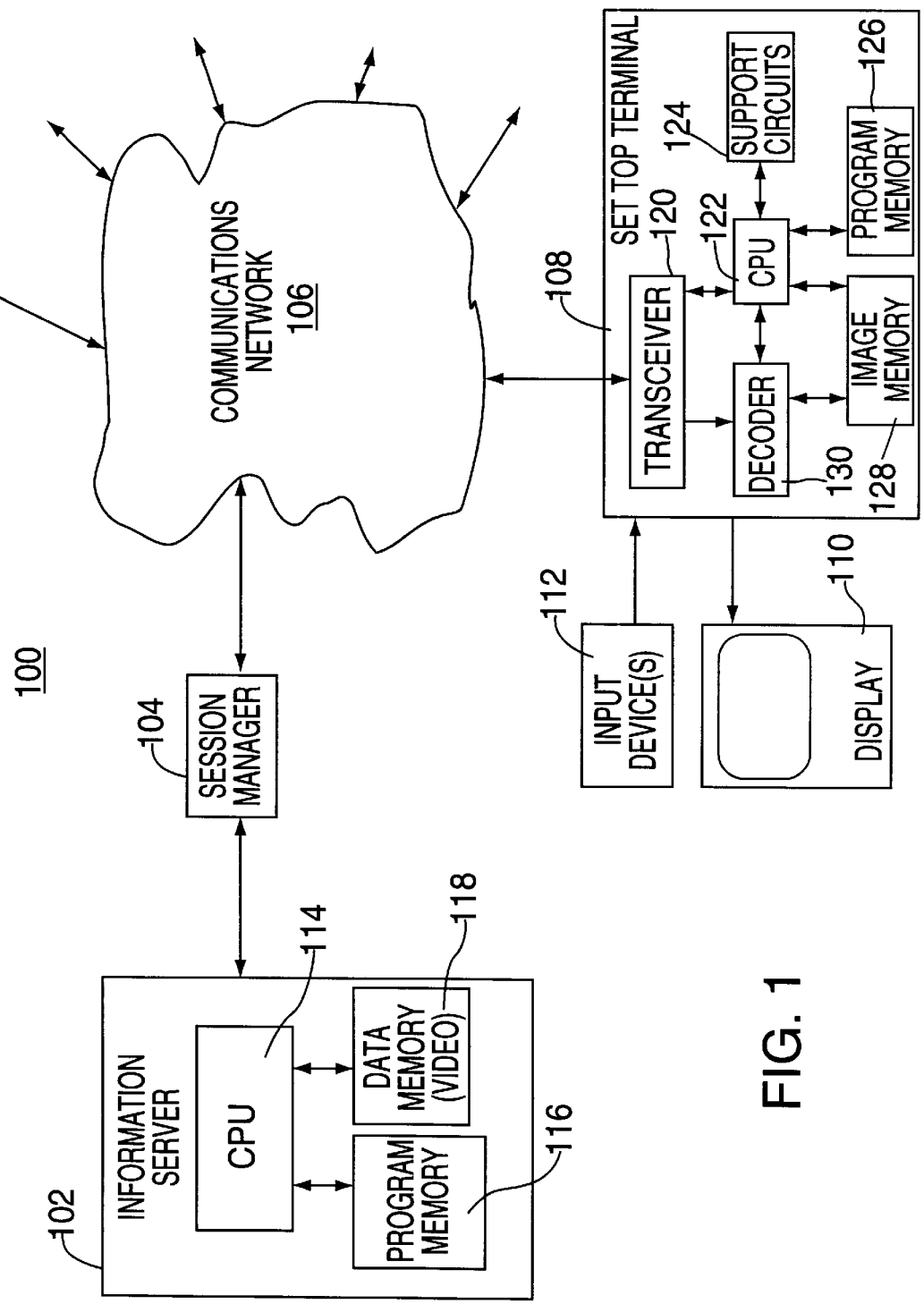
FIG. 1 depicts a high level block diagram of an interactive information distribution system containing the present invention.

FIG. 1 depicts a high level block diagram of an information distribution system 100 that incorporates the present invention. The system contains an information server 102, a session manager 104, a communications network 106, set top terminal 108, a display device 110, and an input device 112 such as a remote control for inputting functions into the set top terminal 108. The information server 102 provides data streams in response to requests for information from the session manager 104. These data streams are packetized and modulated onto a carrier that is compatible with the transmission requirements of the network 106. The data streams are propagated to the set top terminal 108 via a first forward channel, e.g., having a carrier frequency of 50 to 750 MHz and a bandwidth of approximately 6 MHz. Additionally, the system uses a second forward channel for communicating command and control information from the server to the set top terminal, e.g., having a carrier frequency of 50 to 750 MHz and a bandwidth of 1 MHz. Also, the system uses a back channel (or reverse channel) for communicating command and control information from the set top terminal 108 to the server 102. The back channel has a carrier frequency of 5–42 MHz and a bandwidth of 250 kHz. Although the invention is described with respect to this three channel, interactive data distribution system, it should be understood that the invention will function in the context of broadcast-only systems (e.g., systems having a single forward channel) as well as any system that experiences latency before implementing a command.

The session manager 104 handles all of the transmission interface requirements of the system 100. The network can be any one of a number of conventional communications networks that are available such as a hybrid fiber-coax network, telephone network, existing cable television network and the like. For example, if the network is a hybrid fiber-coax network, the transmission transport technique used may be modeled after the Moving Pictures Experts Group (MPEG) transport protocol to transport the information streams from the server to the set top terminals. In general, the transport mechanism for the first forward channel that transports broadband information to the set top terminal must be able to carry unidirectional, asynchronous packetized data, such as that defined in the asynchronous transfer mode (ATM) standard, the Moving Pictures Experts Group (MPEG) standard, and the like. There are many-such broadband forward channel transport mechanisms available.

The set top terminal 108 receives the data streams from the forward channel, demodulates those streams and processes them for display on the display device 110 (e.g., a conventional television). In addition, the set top terminal 108 accepts commands from a remote control 112 or other input device. These commands are formatted, compressed, modulated, and transmitted through the network to the session manager using the back channel. These commands may be transmitted through the same network used to transmit information to the set top terminal. However, the back channel from the set top terminal to the server may be a separate network, e.g., the first forward channel is through a television cable network and the back channel and the second forward channel are through a telephone network. The session manager interprets the commands sent from the set top terminal through the back channel and instructs the information server to perform the command.

More particularly, the information server 102 contains at least one central processing unit 114 and, in a parallel processing computer based server, contains more than one central processing unit 114. Additionally, the server generally contains a program memory 116 that retains the programs which control the server. Some of these programs are executed in response to function requests sent from set top terminals. In addition, the CPU is connected to a data memory 118 that contains the various video and other information that is available to the customers via the system 100.

Additionally, the set top terminal 108 contains a receiver/transmitter (transceiver) 120 for receiving information from both forward channels and transmitting commands through the back channel. If the forward and back channels use a common network, the transceiver is generally operated in a frequency multiplex manner. The transceiver 120 downconverts and demodulates the signals from the network using a conventional superheterodyne downconversion technique, a conventional QAM demodulator for the first forward channel and a conventional QPSK demodulator for the second forward channel. The first forward channel signals are generally transmitted in a standard packetized format such as the MPEG transport protocol of a transport stream. The transceiver contains a conventional MPEG transport decoder to extract particular program streams from the transport stream.

Any video data carried within the program streams via the forward channel is generally compressed using either MPEG-1 or MPEG-2 compression. The compressed video is processed using a conventional MPEG program stream decoder such as the model L64002 manufactured by LSI Logic of Milpitas, Calif. This decoder, when provide with an MPEG-2 compliant bit stream (program stream(s)) produces digital audio and digital video signals. These signals are further processed to convert the digital signals into composite video or RGB signals. To view the video signals on a conventional television, the composite video signal is modulated onto a channel 3/4 carrier and coupled to the display 110.

The set top terminal processes the decompressed information for display upon the display unit 110. The process for converting the decompressed data into information that is displayed is handled, for the most part, by the decoder 130. Command and control functions are accomplished by a central processing unit (CPU)122 operating in conjunction with well known support circuits 124 such as power supplies, cache, clock circuits and the like. In addition, the CPU is coupled to a program memory 126 that stores the programs which are executable by the set top terminal CPU and image memory 128 that contains a plurality of bit map images. The bit map images can be selectively displayed upon the display unit on an as needed basis. Depending upon the size of the image memory, it may also store video clips, audio clips, animation, graphical images, and the like. The present invention is implemented as a software program that is stored in the program memory 126 and, when executed on the central processing unit 122, uses predefined images that are stored in the image memory 128 as well as control decoder processing to "freeze" certain decoded imagery on the display. The software implementation is a latency masking routine that is discussed in detail with reference to FIG. 2.

Figure 2:
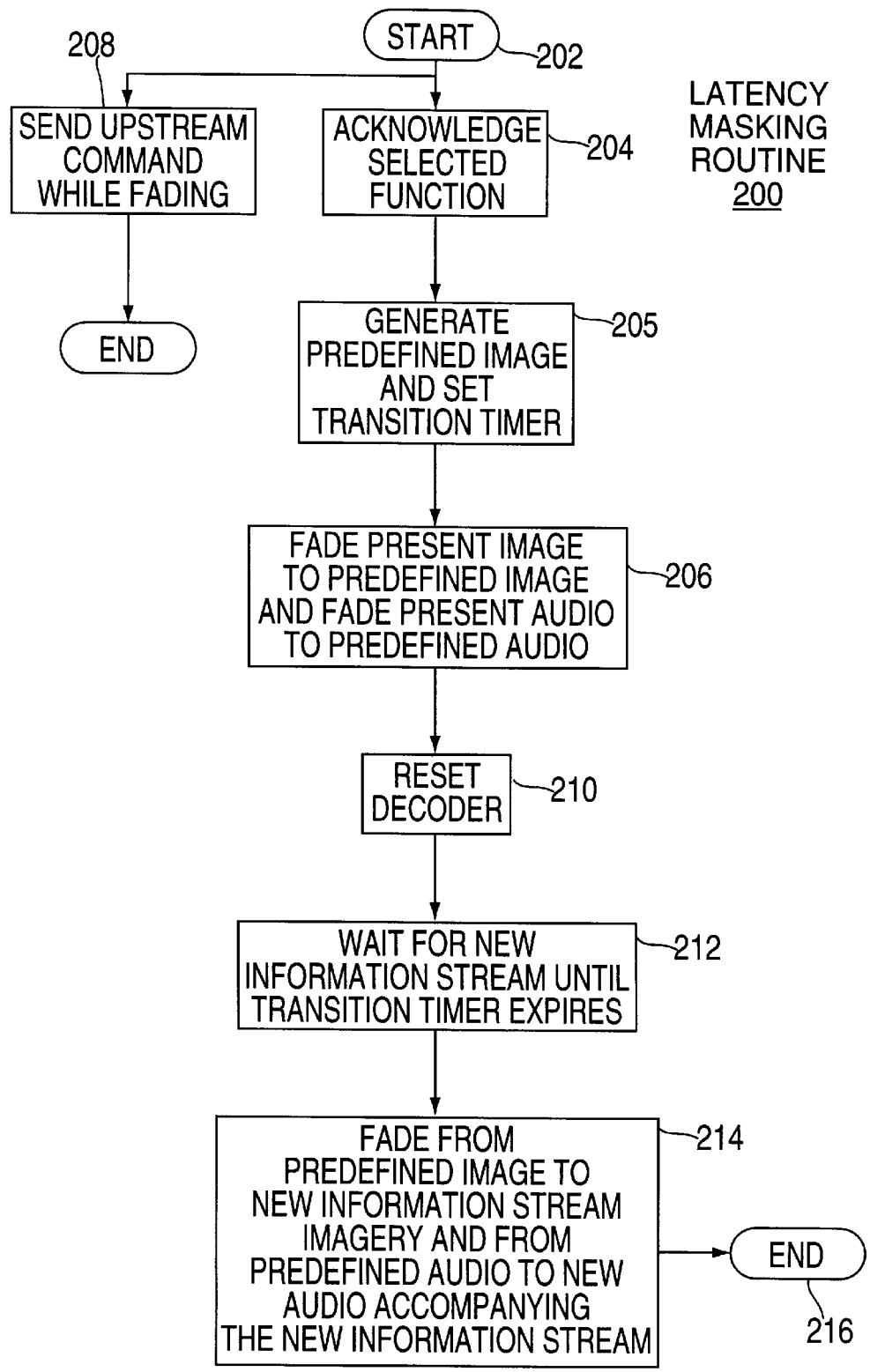
FIG. 2 depicts a flow chart of a software implementation of the present invention.

FIG. 2 depicts a flow chart of the latency masking routine 200 of the present invention that is implemented in software and executed by the CPU within the set top terminal. This latency masking routine is executed whenever a customer selects a particular function that will result in latency, e.g., any function that must be implemented by the server such as a function that affects the data stream. Once such a function is selected, the routine 200 is executed beginning at step 202 and continuing to step 204. At step 204, the routine acknowledges the selected function by displaying that particular function by name or icon upon the screen of the display device. Display of such function information is generally handled by recalling a particular bit map image, overlay image, or on-screen display (OSD) graphic from the image memory for display upon the display unit. Generally, this display is accomplished in an overlay manner so that the function appears semi-transparent or, possibly, fully opaque in, for example, the upper left hand corner of the presently displayed information. The simplest method for generating such a graphic is to use the OSD function of the MPEG decoder to produce a character set on the display unit. The process used to generate OSD characters using an MPEG decoder are well-known in the art.

At the same time as the routine begins acknowledging the selected function, the routine, at step 208, instructs the transceiver to send the upstream command to the information server. In response, the session manager processes the command and sends the command to the server. As a result of the command, a new video stream will be sent to the set top terminal. This new video may be an additional menu, a newly selected movie, and the like.

At step 205, the routine generates a predefined image. This image may be recalled from the image memory (128 in FIG. 1) and sets a transition timer within the decoder. As shall be described below, when the transition timer expires (times out), the routine begins a fade to the new video sequence. The predefined image can be a bit map image, but is more typically, a previously received and decoded sequence of MPEG encoded packets. In the preferred embodiment of the invention, the CPU instructs the MPEG decoder to "freeze" the image that is presently being displayed. Thus, the predefined image is all or a portion of a frozen last frame of video.

At step 206, the routine begins fading the presently displayed video image into the predefined image. In addition, the presently playing audio is also faded to a predefined audio signal, e.g., no sound. Typically, if predefined audio is desired, the predefined audio compliments or is, in some manner, associated with the predefined image stored in the image memory. Preferably, the predefined image is a white background containing a centrally located geometric shape or object. The object is generally designed to distract the user or the customer from observing the latency during command implementation. The predefined image is not required to be static and, for example, can be a video clip, animation segment, a series of static images and the like.

In the preferred embodiment, the frozen image contains a centrally located object that is common to the beginning and ending frames of all video images displayed by the system. To facilitate a transition from one video segment to another, the OSD function of the MPEG decoder is used to "fade" all or part of the frozen image to white. However, the centrally located object is not faded. The fade is accomplished by designating the entire screen except for the object as an OSD graphic region and then fading the graphic overlay from transparent to opaque. The centrally located object is keyed or other wise associated with the previous video segment and is also keyed or associated with the upcoming video segment. As such, this object is contained in the beginning and ending sequence of all displayed video and the viewer experiences a spacial continuity from video segment to video segment.

While the decoder is frozen (or decoding the latency masking imagery), the routine causes the set top terminal to reset the decoder contained in the set top terminal receiver such that the previous images that were being decoded are flushed from the buffer memory of the decoder. Of course, the frozen frame of video information is not flushed from the memory. Moreover, at step 210, other housekeeping measures may be accomplished to clean up registers and other memory devices that were handling the decoding of the previous information stream. At step 212, once the decoder is reset, the set top terminal awaits the new information stream while continuously displaying the predefined image. At step 214, the new information stream is received and begins to be decoded such that the set top terminal may then fade from the predefined image that is presently being displayed to imagery decoded from the new information stream. Also, the predefined audio is faded to the new audio that accompanies the new information stream. Generally, the time required to fade up and fade down the predefined image is approximately two seconds. Of course, this time is directly related to the expected latency of the information distribution system and is typically established using a transition timer within the decoder. The cropped frozen image is repeatedly refreshed on display until the transition timer times out.

To establish the spacial continuity, the decoder is "unfrozen" to produce the new video information which begins with a sequence having the centrally located object. The OSD graphics remain opaque to crop all imagery but the object. Then the OSD graphics fade to transparent to reveal the new video image. As such, the new video information may contain a "precursor" video segment that displays additional transitional imagery prior to the new video information (e.g., movie) beginning.

At step 216, the latency masking routine ends and awaits the next function selected by the subscriber.

By using the method and apparatus of the present invention any latency within the system is effectively masked by the latency masking routine such that the customer does not experience any annoying artifacts displayed on the screen while transitioning from one video sequence to another. In addition, the predefined image that is displayed is visually pleasing such that the latency is not noticed by the customer. Furthermore, the latency mask provides spatial continuity between image sequences such that a viewer is focused on the images and not the latency.

Although the foregoing description of the invention focused upon use of the invention in a video-on-demand system, the invention finds use in other information distribution systems that experience latency. For example, an INTERNET browser could execute the latency masking routine while retrieving a new page of information, downloading lengthy documents, or accomplishing a search. In general, the present invention finds use wherever system latency is observed in an interactive information distribution system.

Although one embodiment which incorporates the teachings of the present invention has been shown and described in detail herein, those skilled in the art can readily devise many other varied embodiments that still incorporate these teachings.

What is claimed is:

1. A method for masking latency within an information distribution system, where said latency occurs while transitioning from a first information stream to a second information stream, said method comprising the steps of:

responding to a user command entered into a transceiver and, simultaneously, sending an upstream data command to an information stream source within the information distribution system to implement said user command;

recalling a predefined image from an image memory;

fading at least a portion of imagery decoded from said first information stream into said predefined image;

fading from said predefined image into imagery decoded from said second information stream; and displaying said imagery from said second information stream.

2. The method of claim 1 further comprising a step of initializing a signal decoder prior to fading from said predefined image into imagery decoded from said second information stream.

3. The method of claim 2 wherein said initializing step further comprises the step of resetting the signal decoder.

4. The method of claim 1 further comprising a step of removing from a signal decoder information pertaining to said first information stream prior to fading from said predefined image into imagery decoded from said second information stream.

5. The method of claim 1 further comprising the steps of:

fading an audio signal associated with said imagery of said first information stream into a predefined audio signal as said imagery of said first information stream is faded into said predefined image; and fading from said predefined audio signal into an audio signal associated with said second information stream as said predefined image is faded into said imagery of said second information stream.

6. The method of claim 1 wherein said predefined image is a white screen, a white screen containing at least one geometric object, animation, or a video clip.

7. The method of claim 5 wherein said predefined audio signal produces no sound or a sound that compliments the predefined image.

8. The method of claim 1 further comprising the step of displaying, in response to said user command, a function selection indicator that identifies a function that corresponds to the user command.

9. The method of claim 1 wherein said predefined image is a portion of a frozen video frame.

10. A method for masking latency within an information distribution system, where said latency occurs while transitioning from a first information stream to a second information stream, said method comprising the steps of:

responding to a user command entered into a transceiver and, simultaneously, sending an upstream data command to the information distribution system to implement said user command;

freezing an image frame of said first information stream and, simultaneously, activating a transition timer;

fading at least a portion of said frozen image frame by masking said portion using an on-screen display overlay;

removing information pertaining to the first information stream from a signal decoder;

upon time out of the transition timer, fading from said frozen image frame into imagery decoded from said second information stream; and displaying said imagery from said second information stream.

11. The method of claim 10 wherein said on-screen display overlay is a white screen that covers at least a portion of said frozen image frame.

12. The method of claim 10 further comprising the steps of:

displaying, in response to said user command, a function selection indicator that identifies a function that corresponds to the user command.

13. The method of claim 10 wherein said on-screen display overlay covers all but an object in said frozen image frame and the object is contained in the second information stream, where having said object in both said first information stream to provide said frozen image frame containing the object and said second information stream provides spatial continuity from the first information stream to the second information stream.

14. Apparatus for masking latency within an information distribution system, where said latency occurs while transitioning from a first information stream to a second information stream, said apparatus comprising:

a transceiver for responding to a user command entered into a set top terminal and for simultaneously sending an upstream data command to an information stream source within the information distribution system to implement said user command;

a processor for recalling a predefined image from an image memory in response to said user command being entered;

a decoder for fading at least a portion of imagery decoded from said first information stream into said predefined image and removing information pertaining to said first information stream from the decoder;

where said processor causes said predefined image to fade into imagery decoded from said second information stream; and a display for displaying said imagery of said second information stream.

15. The apparatus of claim 14 wherein said processor further causes an audio signal associated with said imagery of said first information stream to fade into a predefined audio signal as said imagery of said first information stream is faded into said predefined image, and said predefined audio signal to fade into an audio signal associated with said second information stream as said predefined image is faded into said imagery of said second information stream.

16. The apparatus of claim 14 wherein said predefined imagery is a white screen, a white screen containing at least one geometric object, animation, or a video clip.

17. The apparatus of claim 15 wherein said predefined audio signal produces no sound or a sound that compliments the predefined image.

18. The apparatus of claim 14 wherein said display displays, in response to said user command, a function selection indicator that identifies a function that corresponds to the user command.

19. The apparatus of claim 14 wherein said predefined image is a portion of a frozen video frame.

20. The apparatus of claim 19 wherein said predefined image contains an on-screen display overlay that covers all but an object in said frozen image frame and the object is also contained in the second information stream, where having said object in both said first information stream to provide said frozen image frame containing the object and said second information stream provides spatial continuity from the first information stream to the second information stream.

21. A digital storage medium containing a program that, when executed by a central processing unit, causes the central processing unit and circuitry connected to the central processing unit to perform a method for masking latency within an information distribution system, where said latency occurs while transitioning from a first information stream to a second information stream, said method comprising the steps of:

responding to a user command entered into a transceiver and, simultaneously, sending an upstream data command to a information stream source within the information distribution system to implement said user command;

recalling a predefined image from an image memory;

fading at least a portion of imagery decoded from said first information stream into said predefined image;

fading from said predefined image into imagery decoded from said second information stream; and displaying said imagery from said second information stream.

22. The medium of claim 21 wherein said method further comprises a step of initializing a signal decoder within said receiver prior to fading from said predefined image into imagery decoded from said second information stream.

23. The medium of claim 22 wherein said initializing step further comprises the step of resetting the signal decoder.

24. The medium of claim 21 wherein said method further comprises a step of removing from a signal decoder within said receiver information pertaining to said first information stream prior to fading from said predefined image into imagery decoded from said second information stream.

25. The medium of claim 21 wherein said method further comprises the steps of:

fading an audio signal associated with said imagery of said first information stream into a predefined audio signal as said imagery of said first information stream is faded into said predefined image; and fading from said predefined audio signal into an audio signal associated with said second information stream as said predefined image is faded into said imagery of said second information stream.

26. The medium of claim 21 wherein said predefined image is a white screen, a white screen containing at least one geometric object, animation, or a video clip.

27. The medium of claim 26 wherein said predefined audio signal produces no sound or a sound that compliments the predefined image.

28. The medium of claim 21 wherein said method further comprises the steps of:

displaying, in response to said user command, a function selection indicator that identifies a function that corresponds to the user command.

29. The medium of claim 21 wherein said predefined image is a portion of a frozen video frame.

* * * * *